N. J. OLSSON.
MEANS FOR AUTOMATICALLY CUTTING OFF THE FEED MOTION OF MACHINE TOOLS.
APPLICATION FILED JUNE 22, 1918.

1,349,222.

Patented Aug. 10, 1920.
2 SHEETS—SHEET 1.

INVENTOR:
Nils Josef Olsson
By Attys
Fraser, Dunk & Myers

N. J. OLSSON.
MEANS FOR AUTOMATICALLY CUTTING OFF THE FEED MOTION OF MACHINE TOOLS.
APPLICATION FILED JUNE 22, 1918.

1,349,222.

Patented Aug. 10, 1920.
2 SHEETS—SHEET 2.

INVENTOR:
Nils Josef Olsson
By Attys.

UNITED STATES PATENT OFFICE.

NILS JOSEF OLSSON, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

MEANS FOR AUTOMATICALLY CUTTING OFF THE FEED-MOTION OF MACHINE-TOOLS.

1,349,222.    Specification of Letters Patent.    Patented Aug. 10, 1920.

Application filed June 22, 1918. Serial No. 241,392.

*To all whom it may concern:*

Be it known that I, NILS JOSEF OLSSON, a subject of the King of Sweden, residing at Gottenborg, in the Kingdom of Sweden, have invented certain new and useful Improved Means for Automatically Cutting Off the Feed-Motion of Machine-Tools, of which the following is a specification.

This invention relates to automatically operating devices for cutting off the feed motion of grinding machines or other machine tools when the work reaches its desired diameter, and particularly to devices of that class in which a pivotally mounted lever bears constantly upon the work or upon a member bearing, in turn, upon the work. In heretofore known devices of the said kind, a contact in a circuit controlling the stopping of the feed motion is successively moved, as the diameter of the work is reduced, to a position in which it closes the circuit. Such devices, however, have not proved absolutely reliable, as a closing of said circuit may already occur before the desired diameter has been exactly reached owing to the formation of a spark bridge between the contacts during the final steps of the grinding operation during which the distance between said contacts is very small.

According to this invention, the said inconvenience is overcome by so arranging the pivotally mounted lever bearing against the work or against a member, bearing in turn upon the work, and so forming the said lever at the contact point that, when the desired diameter of the work has been reached, the lever will by means of a spring, a weight or the like be brought out of engagement with the work, thus initiating the cutting off of the feed motion.

In the accompanying drawings some embodiments of the invention are illustrated.

Figure 1:
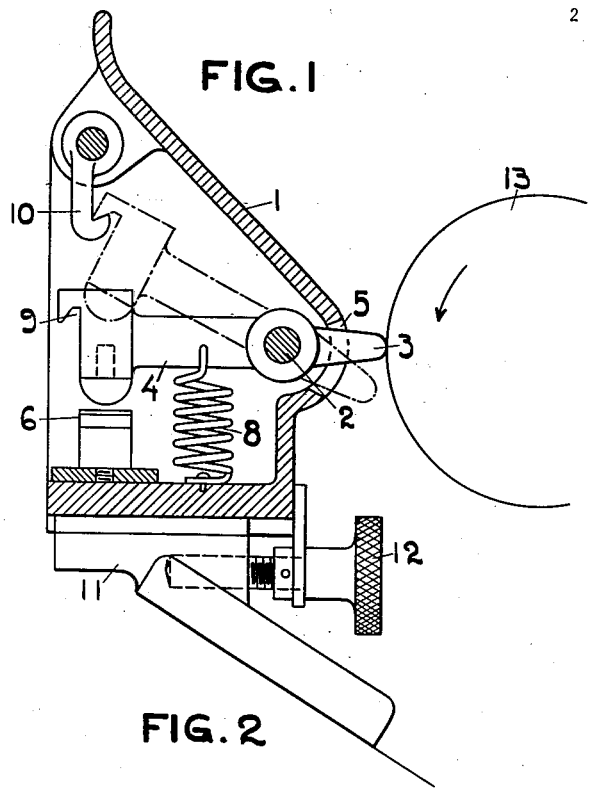
Figure 2:
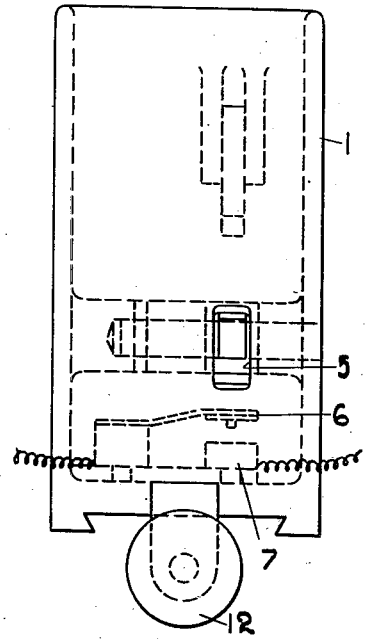
Figure 5:
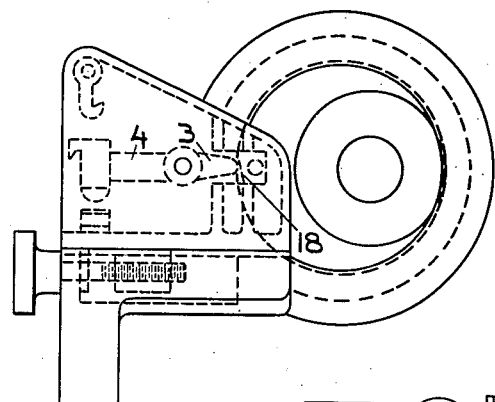
Figure 4:
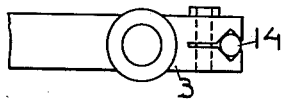
Figure 3:
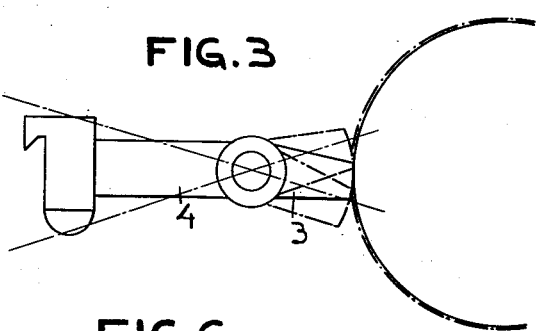
Figure 6:
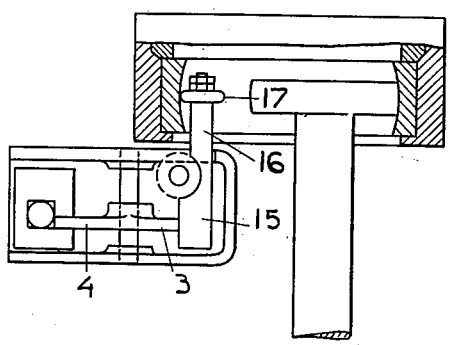

Figure 1 is a cross-section of a device constructed in accordance with one embodiment of the invention. Fig. 2 is an elevation of said device shown from the right of Fig. 1. Figs. 3 and 4 show modifications of the lever. Fig. 5 is a side elevation and Fig. 6 is a horizontal section of a device constructed according to another embodiment of the invention.

Referring to Figs. 1 and 2, 1 indicates a casing inclosing a lever 3, 4 mounted on the pivot 2, one arm 3 of said lever extending through an opening 5 of the casing, the other arm 4 being formed as a hammer. Mounted below said hammer is a contact spring 6 adapted to coöperate with an underlying fixed contact piece 7. The arm 4 is controlled by a spring 8 tending to keep the lever 3, 4 in the position, in which the hammer keeps the spring 6 in contact with the fixed contact 7. The hammer of the arm 4 is formed with a hook-shaped portion 9 adapted to coöperate with a pawl 10 for keeping the lever out of operative position.

The contacts 6 and 7 are intended to be included in the circuit of an apparatus for cutting off the feed motion of the grinding machine or other machine tool in connection with which the device is intended to be used. Said apparatus may be of any convenient or known type and will not be described as it does not form any part of this invention. The distance between the contacts 6 and 7 should be so chosen that the tension existing in the said circuit will not be high enough to cause the formation of sparks between the contacts as the spring 6 is in its normal position.

The casing 1 is adjustably mounted upon a suitable base 11 which may form part of the grinding machine or other machine tool and which may be displaced in the longitudinal direction of the lever 3, 4 by means of the set-screw 12.

The apparatus shown in Figs. 1 and 2 is especially adapted for use in combination with grinding machines for external grinding operations.

When the apparatus is to be used, the lever 3, 4 is locked by means of the pawl 10 in the position shown by dotted lines in Fig. 1, whereupon the casing 1 is so adjusted by means of the screw 12 that the arm 3 of the lever 3, 4 will upon the release of the lever be brought in contact with the circumference of the work beneath the horizontal diameter thereof and can be moved upward past said central position only after the work has reached the desired diameter. The work 13 should be rotated in the direction of the arrow so as not to tend to press the arm 3 upward past the said central position. When the desired ultimate diameter has been reached, the arm 3 is free to move upward and the spring 8 will, consequently, immediately swing the lever thus causing the hammer of the lever-arm 4 to press the contact spring 6 against the fixed contact 7 thereby closing the circuit controlling the cutting off the feed motion of the grinding machine.

In the apparatus above described there is no tendency for premature circuit closing, inasmuch as the lever 3, 4 is completely out of engagement with the contact spring 6 before it has passed the central position. The normally existing distance between the contacts 6 and 7, which is large enough to prevent the formation of sparks, will thus be constant until the moment, at which the closing is to take place.

In the embodiment above referred to, the end of the arm 3 is rounded after an arc with small radius so that the uttermost point of said arm will bear against the work only at the moment, at which the lever arm 3 passes the central position. The wear in the point determining the cutting off action will, thus, be exceedingly small. The form of the arm 3 may, however, be so modified as to prevent, in a still higher degree, changes of the effective length of the arm owing to the wear caused by the work. Two such embodiments are shown in Fig. 3 and 4 respectively.

Referring to Fig. 3, the end of the arm 3 is formed as an arc the center of curvature of which coincides with the center of the pivot of the arm 3, 4. With this construction the effect of the wear on the reliability of the apparatus is practically completely eliminated the lever 3, 4 initiating the cutting off operation exactly, at the desired moment as long as any point of the original arc remains unaltered i. e. during a practically unlimited time, inasmuch as the arc proper is in contact with the work at the releasing moment only.

In the embodiment shown in Fig. 4, a preferably hardened steel ball 14 is mounted in the end of the arm 3, said ball being kept in place in any suitable manner and may after wearing be adjusted so as to turn an unaffected point toward the work thereby restoring the original length of the lever arm. Instead of the steel ball I may use another object of any suitable hard material, as for instance a diamond.

In Figs. 5 and 6 a releasing device is shown which may be used in combination with grinding machines for internal as well as for external grinding operations. In the drawing the invention is shown as applied to a machine for grinding the inner surface of a ball bearing ring.

In this embodiment, the arm 3 of the lever 3, 4 bears upon one arm 15 of a lever 15, 16 pivotally mounted to move in a plane at right angles to the plane in which the lever 3, 4 moves. The arm 16 of the lever 15, 16 carries a rotatably mounted roller 17 or the like adapted to bear upon the surface to be ground, as shown in Fig. 6. The arm 15 is formed with an oblique surface 18 adapted to be engaged by the end of the arm 3 the lever 3, 4 thus tending, under the action of its spring, to keep the lever 15, 16 with the roller 17 in such position that the said roller constantly bears upon the surface to be ground. The apparatus should be so adjusted that, when the surface to be ground has reached its desired size, the arm 3 can leave the arm 15 and cut off the feed motion in any well known or suitable manner.

It is obvious that the arm 3 of this apparatus may be modified in the manner shown in Fig. 3 or 4.

The spring controlling the lever 3, 4 may, if desired, be replaced by a suitable weight.

It should be noted, that the invention has been described by way of example only as applied in such manner that the cutting off of the feed motion is initiated by closing an electric circuit. It is evident that the apparatus may without departing from the scope or principle of the invention be so modified as to initiate the said cutting off action by opening an electric circuit.

The apparatus may be further modified by causing the lever 3, 4 to operate a completely mechanical device for initiating the cutting off of the feed motion.

A further modification is disclosed in my co-pending application, Serial No. 247,784, filed August 1, 1918.

What I claim is:

1. In a device for automatically cutting off the feed motion of machine tools, the combination of a pivoted trip member one end of which engages the unfinished work and thereby holds it in inoperative position, and means controlled thereby to operate a feed motion cut off, the member being released from engagement with the work substantially at the instant when the work has reached a predetermined size and thereby actuating the operating means of the feed cut off.

2. In a device for automatically cutting off the feed motion of machine tools, the combination of a pivoted trip member, one end of which engages the unfinished work below a line drawn from the pivot point of the member to the center of the work, and means controlled thereby to operate a feed motion cut off, the member being normally held out of operative engagement with the operating means of the feed cut off and being tripped substantially at the instant when the work has reached a predetermined size, and thereby actuating the operating means of the feed cut off.

3. In a device for automatically cutting off the feed motion of machine tools, the combination of a pivoted trip member, one end of which engages the unfinished work, and the other of which is weighted, and a pair of contact elements, adapted to be operated by said weighted end, the said pair of contact elements controlling a feed motion cut off and the said pivoted member being released from engagement with the work substantially at the instant when the work has reached a predetermined size.

In testimony whereof I affix my signature.

NILS JOSEF OLSSON.